June 10, 1924.
H. W. ENGEL
1,497,492
MULTIPLE SCALE INSTRUMENT
Filed Sept. 16, 1921
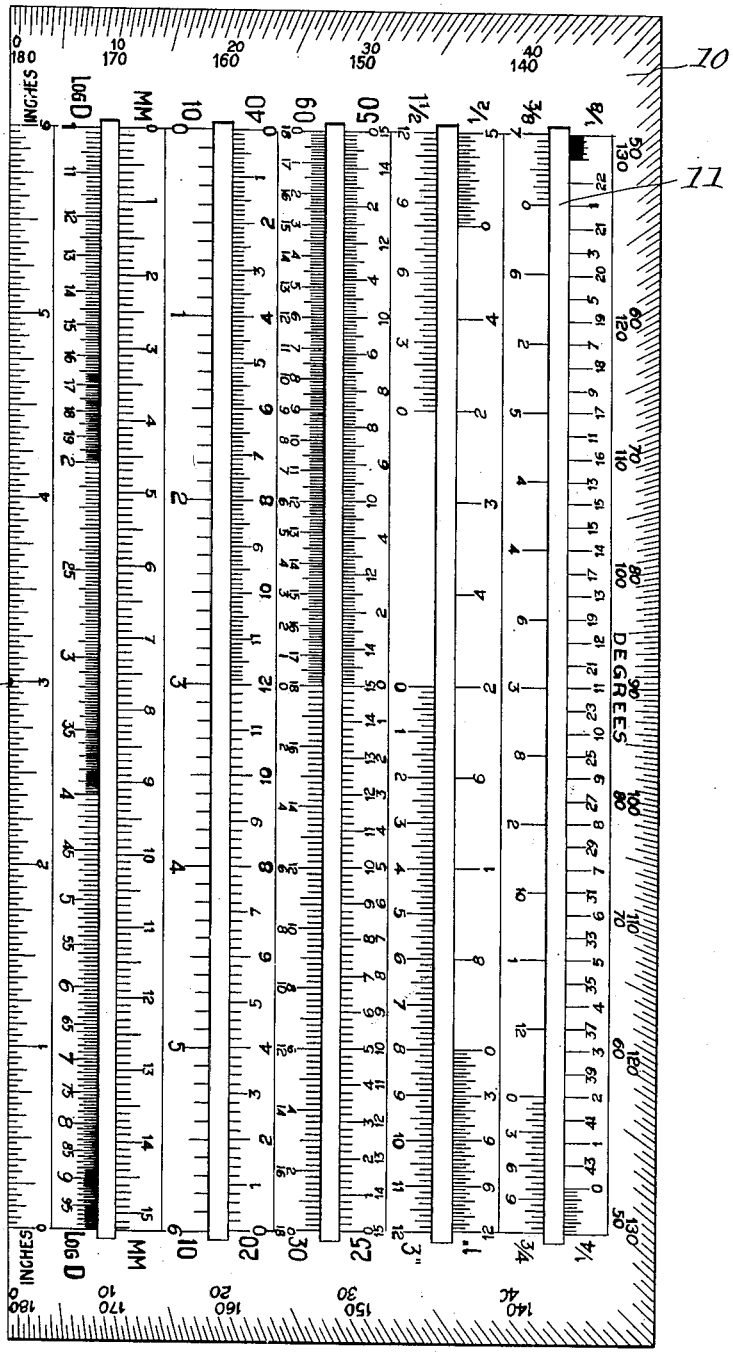
INVENTOR
Henry W. Engel,
BY
Meyers, Cavanagh, Whitehead & Hyde
ATTORNEYS Patented June 10, 1924.

1,497,492

UNITED STATES PATENT OFFICE.

HENRY W. ENGEL, OF PALISADES PARK, NEW JERSEY.

MULTIPLE-SCALE INSTRUMENT.

Application filed September 16, 1921. Serial No. 501,048.

*To all whom it may concern:*

Be it known that I, HENRY W. ENGEL, a citizen of the United States, and resident of Palisades Park, in the county of Bergen and State of New Jersey, have invented certain new and useful Improvements in Multiple-Scale Instruments, of which the following is a specification.

My invention relates to measuring and calculating instruments and is particularly directed to a device adapted to carry a large number of scales in convenient, compact and readily available form.

In the various branches of engineering, architecture and allied occupations a relatively large number of standard scales are regularly used, including particularly scales adapted for the reduction of dimensions given in feet to a scale in inches or fractions thereof; direct measurement scales in various sub-divisions in inches and centimeters; and scales of logarithms, degrees, and other units for either measurement or calculation. Such scales are employed not only by those making drawings or sketches, but also by engineers and others checking up such drawings or measuring elements thereof.

Owing to the inconvenience of employing the large number of flat rulers necessary to carry the various scales required, it has heretofore been the general practice to employ triangular rulers each carrying six scales, two to an edge. Such rulers however are necessarily bulky and are particularly inconvenient to carry in the pocket. This objection is especially cogent in connection with the work of those who are required to check up and measure plans or drawings, as this work ordinarily makes it necessary to carry one or two triangular rulers in the pocket. The bulk of such rulers makes this practice highly inconvenient.

A primary object of my invention is to produce a unitary instrument on which may be inscribed all the scales required for any particular type of work, and which at the same time is compact and adapted to be carried readily in the pocket or in a convenient flat case, without interfering with the efficiency and readiness with which any of the scales may be employed.

Another more specific object is to develop a device of this type which may be constructed from a single sheet of suitable material, such as celluloid, so arranged that every scale, regardless of the number of scales carried by the instrument, may be located along an edge of the device if desired, and the whole may at the same time be so proportioned as to fit the pocket readily.

I am aware that measuring devices have been known which embody a number of scales in one flat instrument; but I believe I am the first to provide a device capable of combining practically any number of scales required for any standard engineering, architectural, or similar use, in a relatively small, compact and commercially practical instrument.

Other objects and advantages of my invention will be apparent from the following description taken in connection with the accompanying drawings in which the single figure shows a plan view of a preferred form of my invention.

As indicated in the drawing, I preferably form the device from a substantially rectangular sheet of any preferred material; but I have found that celluloid is particularly useful for the purpose, owing to its substantial transparency and adaptability to the particular contour disclosed. The body of the instrument 10 is provided with a plurality of slots 11, which preferably extend mainly or wholly in a longitudinal direction and parallel to each other, the distance between slots being varied in accordance with the number of scales required and the strength of the material employed. Along both edges of each slot 11 are inscribed scale markings of any desired form, so that each slot edge forms practically a separate ruler. While a considerable variety of scales is well known, those most commonly in use are of three general classes, namely: those on the basis of a predetermined fraction of an inch to the foot; those on the basis of a number of parts to the inch; and scales for direct measurement in inches or metric units. In the example shown the four scales under the two right-hand slots are of the first class; four along the third and fourth slots from the right are of the second class; and the scales along the left edge of the instrument and along the right-hand edge of the left slot are of the third class. Counting the scales from right to left of the drawing, it will be noted that the first scale is adapted for measurements either on the basis of one-eighth inch to the foot, or one-quarter inch to the foot, the upper row of measurement figures being on the former basis and the lower row on the latter, while at each end of the scale I have employed sub-divisions of each unit into inches. The second scale is similarly marked on a three-eighth inch-three-quarter inch basis; the third scale on a one-half inch-one inch basis. The fourth scale, which is a one and one-half inch-three inch scale, illustrates a different method of inscribing the measurements, as the one and one-half inch scale is at one end of the slot edge and the three inch scale at the other.

The fifth scale is on the basis of twenty-five parts to the inch throughout the lower half and fifty parts to the inch throughout the upper half; but obviously since one scale is double the other, the entire edge can be used for either proportion. The next two scales which are respectively, thirty and sixty parts to the inch and twenty and forty parts to the inch are similarly arranged, while the eighth scale is on a straight ten parts to the inch basis. Various methods of arranging the numerals on proportional scales of this type are well known, and it is understood that any desired changes of this nature can be made.

The ninth scale is sub-divided into centimeters and millimeters for metric measures; while the scale along the left-hand edge is divided into inches and is sub-divided into thirty-seconds. The tenth scale is a standard scale of logarithms, permitting engineers and others to take advantage of this ready and rapid method of computation so largely used in checking over drawings.

I have also embodied in the instrument a protractor, which is rendered particularly useful owing to the long sweep between the center 12 and the markings around the edge of the instrument which permits unusually accurate measurement. It is however obvious that the center from which the protractor markings are taken can be varied considerably in location, and any standard device for use in connecting the center and the markings can be employed, the arrangement shown being readily adaptable to the use of a thread or a straight edge for the purpose.

I have disclosed the preferred form of my invention as rectangular; but it will be appreciated that while this general shape is necessary for the production of the most convenient and compact instrument, certain variations of one or more edges may readily be made either in the form of curves or angular edges without eliminating the main advantages of my invention; and I therefore consider such constructions to fall within the scope thereof.

While I have indicated certain specific scales and a particular arrangement thereof, together with a limited number of slots, it will be readily understood that both of these features may be substantially varied within the scope of my invention. It will furthermore be appreciated that within the maximum width permissible for pocket instruments a very large number of slots may be employed, making it easily possible to inscribe on single instruments all scales which could possibly be of service. Furthermore, while I have shown all the slots as parallel and extending longitudinally, and while this is a very important feature of my invention, I wish it clearly understood that I am fully aware of the possibilities of re-arranging the slots if desired, and of employing additional slots in other than a longitudinal position. I am also aware that the location of the protractor markings may be considerably varied. However, my invention involves the location of a large number of scales along edges of the instrument so that it is possible not only to take measurements but also to actually draw lines along the various scales.

While I have disclosed the preferred form of my invention and have indicated certain modifications therein, it will be apparent that other changes may be made therein by those skilled in the art within the scope of my invention.

I claim:

1. A multiple scale instrument formed from a substantially rectangular sheet of material having a plurality of parallel slots therein, a plurality of scales marked thereon extending along the slot edges, said scales having different characteristics and one of said scales being a logarithmic scale and scales marked on the instrument along the outer edges thereof, one of said last mentioned scales being adapted for measurement of angles.

2. A pocket size multiple scale instrument formed from a rectangular integral sheet of transparent material having a plurality of parallel, longitudinal slots therein, a plurality of scales marked thereon extending along both edges of each slot, and scales extending along the outer edges of the instrument including a protractor scale extending along three of said last mentioned edges and having a center adjacent the middle of the fourth edge.

Signed at New York, in the county of New York, and State of New York, this 14th day of September, A. D. 1921.

HENRY W. ENGEL.